Dec. 2, 1969  H. F. RONDEAU  3,481,634

STUD ATTACHING

Filed Nov. 20, 1967

Inventor
Herbert F. Rondeau
By his Attorney though the washer 20 itself may be flexed to some extent, such flexing having no detrimental effect on the invention.

United States Patent Office 3,481,634
Patented Dec. 2, 1969

3,481,634
STUD ATTACHING
Herbert F. Rondeau, Winchester, Mass., assignor to USM Corporation, Flemington, N.J., a corporation of New Jersey
Filed Nov. 20, 1967, Ser. No. 684,418
Int. Cl. F16b 9/00, 11/00, 13/00
U.S. Cl. 287—20.2                                                1 Claim

ABSTRACT OF THE DISCLOSURE

This invention relates to means and method for permanently attaching a metal fixture to a metal surface comprising placing one end of the fixture against the surface in abutting relationship, the abutting end of the fixture being provided with a supply of brazing material, mounting an exothermic member on the fixture adjacent the abutting end, and energizing the member to cause it to emit sufficient heat to melt the brazing material whereby to braze the fixture to the surface. The invention further relates to means for mechanically attaching the fixture to the surface in preparation for its attachment by brazing.

BACKGROUND OF THE INVENTION

Field of the invention

The invention relates to stud attaching and is directed more particularly to mechanical means for attaching a fixture or stud to a surface and means and method for then brazing the fixture or stud to the surface.

DESCRIPTION OF THE PRIOR ART

It is common practice to attach metal fixtures or studs to metal surfaces by welding. To weld a fixture or stud to a surface requires an electrical energy source, i.e., power lines or generator or battery. Such welding also requires a welding gun or hand tool.

Probably in most instances the welding is conducted in a shop or factory where electrical power supply is not a problem. However, there are occasions when it is beneficial to be able to affix a stud to a support without having to have the hardware usually associated with welding.

SUMMARY OF THE INVENTION

It is an object of the present invention to provide means and method for fixing a stud or other metal body to a surface without the use of an electrical power source and without the use of a welding gun or similar tool.

It is a further object of the invention to provide means for temporarily attaching the stud to the support before it is permanently fixed thereto, which attaching means permits the stud to be disposed in positions other than vertical, as well as vertical.

With the above and other objects in view, as will hereinafter appear, the present invention contemplates as a feature thereof the provision of a method for permanently attaching a metal stud to a metal supporting surface comprising the steps of placing a first end of the stud in abutting relationship with the surface; said first end being provided with a brazing material, placing an ignitable exothermic collar around the stud and adjacent the supporting surface, and igniting the collar which heats the brazing material until it becomes molten and serves to braze the stud to the surface.

In accordance with a further feature of the invention, means are provided for temporarily fastening the stud to the surface sufficiently to hold the stud in place at various angles until the brazing can be accomplished, the holding means comprising a washer which retains an enlarged portion of the stud and which has clinching elements capable of gripping the surface to which the stud is to be attached.

The above and other features of the invention, including various novel details of construction and combinations of parts, will now be more particularly described with reference to the accompanying drawings and pointed out in the claim. It will be understood that the particular method and means embodying the invention is shown by way of illustration only and not as a limitation of the invention. The principles and features of this invention may be employed in various and numerous embodiments without departing from the scope of the invention.

DESCRIPTION OF THE PREFERRED EMBODIMENTS

Figure 1:
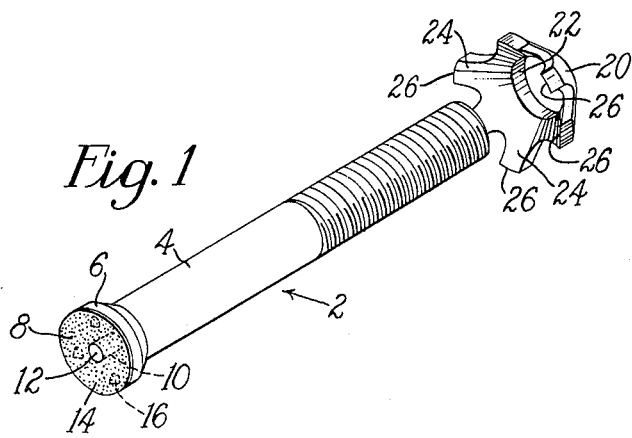
FIG. 1 is a perspective view of one form of a stud and washer illustrative of an embodiment of the invention.

Referring to FIG. 1, it will be seen that a stud 2 suitable for attachment to a metal support in accordance with the present invention, comprises a shank 4 having at one end an enlarged portion 6. The enlarged stud portion 6 has an end face 8 in which there is a recess 10 of any convenient shape which serves as a reservoir for a brazing material 12. The face 8 of the stud may be provided with a coating of brazing flux 14. The stud face 8 may also be provided with projections 16 which provide for air space between the face 8 and a support to which the stud is to be attached.

A metal washer 20 is provided for mechanically affixing the stud 2 to a support prior to the brazing operation. The washer 20 has a central aperture 22 which is of a diameter substantially equal to or slightly larger than the diameter of the shank portion 4 of the stud 2. Thus, the washer may be readily slipped over the shank 4 of the stud 2. The washer is somewhat dished, as may be seen in FIG. 1, and is of such a contour as to engage the enlarged portion 6 of the stud. About its periphery the washer 20 is provided with extended portions 24 having sharp edges 26 on the concave side of the washer.

Referring to FIGS. 2–5, it will be seen that the stud 2 may be secured to a vertical wall. In like manner the stud may be affixed to a support which is disposed at any attitude, as will be described below.

Figure 2:
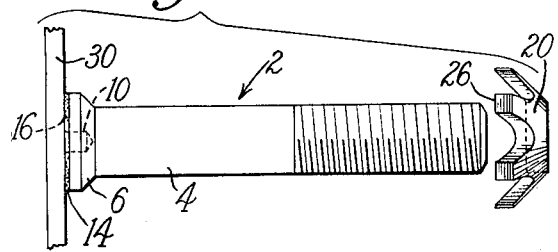
FIG. 2 is an elevational view showing a stud in abutting relationship with a metal support to which the stud is to be affixed, and a washer in side elevation.

Referring to FIG. 2, it will be seen that the stud 2 is first placed such that the enlarged portion 6 of the stud abuts a support 30 to which the stud is to be attached. The washer 20, as described above, is provided for slipping over the free end of the stud and along the stud shaft 4 until the washer engages the enlarged portion 6 of the stud.

Figure 3:
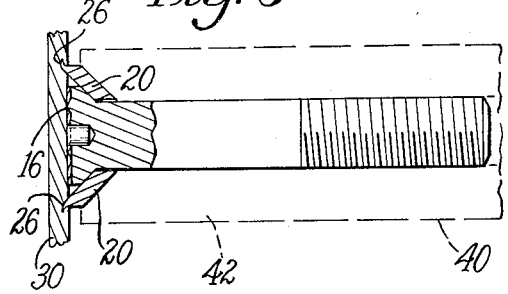
FIG. 3 is similar to FIG. 2, but shows the washer in section and in place for temporarily securing the stud to the support.

A tool 40, shown in phantom in FIG. 3, is used to hammer the washer 20 into the support 30, the sharp edges 26 of the washer extension 24 acting as clinching teeth which bite into the surface of the support 30 to hold the stud in place by mechanical attachment to the support. The tool 40 includes an annular portion 42 which fits over the stud and engages the convex side of the washer. By movement of the tool, as by hammering, the sharp edges of the washer are forced into the support. The tool is withdrawn, leaving the stud attached to the support.

Figure 4:
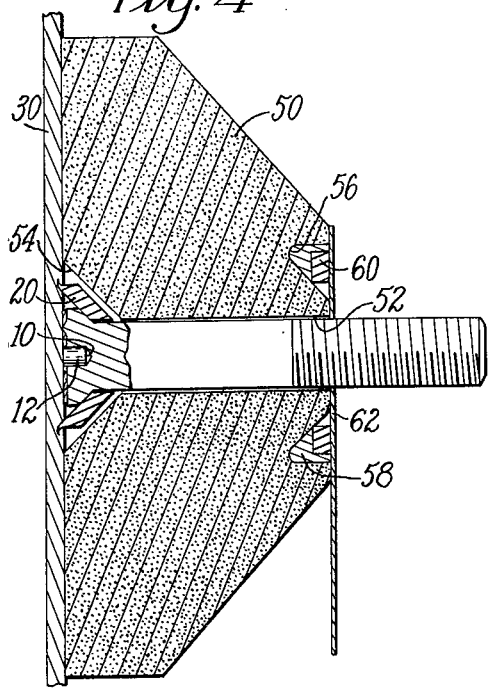
FIG. 4 is similar to FIG. 3, but shows the exothermic collar in section and in place for a brazing operation.
Figure 5:
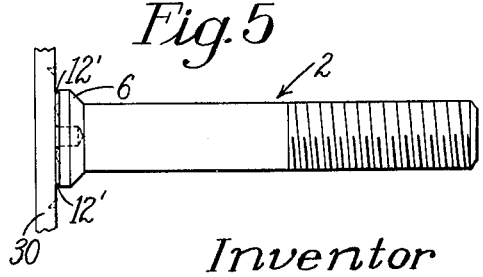
FIG. 5 is an elevational view of the stud after the collar has been ignited and removed, and after the washer has been removed.

As may be seen in FIG. 4, the stud receives an exothermic member which may be a heat collar 50 which, when ignited, provides sufficient heat to melt the brazing material 12 in the stud recess 10. The heat producing collar 50 is provided with an axial hole 52 for receiving the shank portion of the stud and is provided with a recess 54 which receives the washer 20 when the collar is abutting the support 30.

The heat collar 50 is of such composition that it is burnable but does not decompose as it burns. Thus, after the collar 50 has burned, it still remains in one piece and may, after cooling, be removed from the stud and discarded, thereby obviating the need for extensive cleaning of the area after completion of a stud attaching operation. One heat sleeve composition which has performed satisfactorily comprises 80.5% by weight of common foundry sleeve compound, which is a commercially available moldable exothermic mixture containing aluminum granules, iron oxide, and silica, and 12.0% potassium chlorate, 6.0% barium chlorate, and 1.5% flaked aluminum.

The collar 50 is provided with an annular groove 56 (FIG. 4) in which is disposed thermit powder 58. A ring 60 of compressed nitrocellulose is placed over the powder 58 and both the powder and the ring 60 are capped with a paper washer 62 which serves as a starting fuse and also as a means for holding the powder 58 and the ring 60 in place. The starting components, i.e., the paper 62, the ring 60 and the powder 58 are necessary to raise the temperature of a surface of the collar 50 to about 2000° F. at which point the collar will ignite and burn. Thus, ignition of the paper wafer 62 by any readily available means causes the paper to burn and ignite the nitrocellulose ring which in turn ignites and burns and sufficiently heats the thermit powder 58 to cause ignition of the powder. Burning of thermit powder 58 heats the collar 50 sufficiently to ignite the collar. Burning of the collar causes enough heat to flow into the stud to melt the brazing material 12.

When the brazing material 12 melts, it is drawn by capillary action radially outwardly from the center of the stud between the face 8 of the stud and the support 30 to the edge of the enlarged portion 6 of the stud. After the heat collar 50 and the washer 20 have been removed the melted and re-solidified brazing material 12' (FIG. 5) may be observed about the periphery of the enlarged portion 6 of the stud. Thus, the joint is susceptible to a visual check almost immediately after it has been made. It is not necessary that the washer 20 be removed from the stud after the brazing operation. However, removal of the washer facilitates visual inspection of the braze joint.

If desired, securing means such as a spring clip (not shown) may be used to retain the heat collar on the stud when the stud is at such an angle as to permit the collar to slip off by force of gravity.

As is evident from the above description, the present invention facilitates the permanent attachment of the metal stud 2 to the metal surface 30 without the need of an external power source, welding tools, or even the provision of a hole in the support. Thus, the stud can be affixed to the support in areas remote from the usual power sources and without weakening the support to which the stud is attached.

In addition to stud attaching, essentially the same method may be utilized to anneal or harden studs or other metal fixtures, such as shafts, etc., in places not readily accessible or susceptible to ordinary annealing practices. In order to adapt the present process and means to an annealing or hardening operation, it is necessary only to place the exothermic member, as above described, on the fixture to be treated, ignite the member, and after completion of combustion remove the exothermic member and, depending upon whether annealing or hardening is desired, quench or otherwise cool the fixture to reduce its temperature. In this manner studs which previously have been attached may be heat treated without removal from their operative location. The heat-emitting properties of the exothermic member may be altered by changes in composition or simply size in order to be matched with the job at hand, whether it be stud attaching, annealing, or hardening.

While a stud has been shown and described for illustrative purposes, it is apparent that the means and method herein described is equally applicable to metal fixtures generally and it is intended that the word "stud" be interpreted to mean metal fixtures generally.

Having thus described my invention, what I claim as new and desire to secure by Letters Patent of the United States is:

1. A fixture attaching assembly comprising a metal fixture, brazing material disposed in a position to flow across a first end of said fixture, said fixture first end comprising an enlarged portion of said fixture, a dished shaped washer adapted to be mounted on said fixture, said washer being engageable with said enlarged portion of said fixture, said washer having extended portions with sharp edges on the concave side of said washer for engaging a metal surface to which the fixture is to be attached, whereby to connect the fixture to the surface, and a burnable heat producing collar for mounting on said fixture and for producing heat to melt said brazing material, whereby to braze said fixture to said metal surface.

References Cited

UNITED STATES PATENTS

| 1,592,525 | 7/1926 | Hosking | 151—35 |
| 2,569,956 | 10/1951 | Schiltknecht | 228—56 |
| 3,070,874 | 1/1963 | Davis | 29—157 |
| 3,226,140 | 12/1965 | Voegeli | 287—20.2 |

FOREIGN PATENTS

| 743,651 | 1/1956 | Great Britain. |
| 650,767 | 6/1963 | Italy. |
| 1,335,853 | 7/1963 | France. |

DAVID J. WILLIAMOWSKY, Primary Examiner

ANDREW V. KUNDRAT, Assistant Examiner

U.S. Cl. X.R.

151—41.7